Patented June 1, 1943

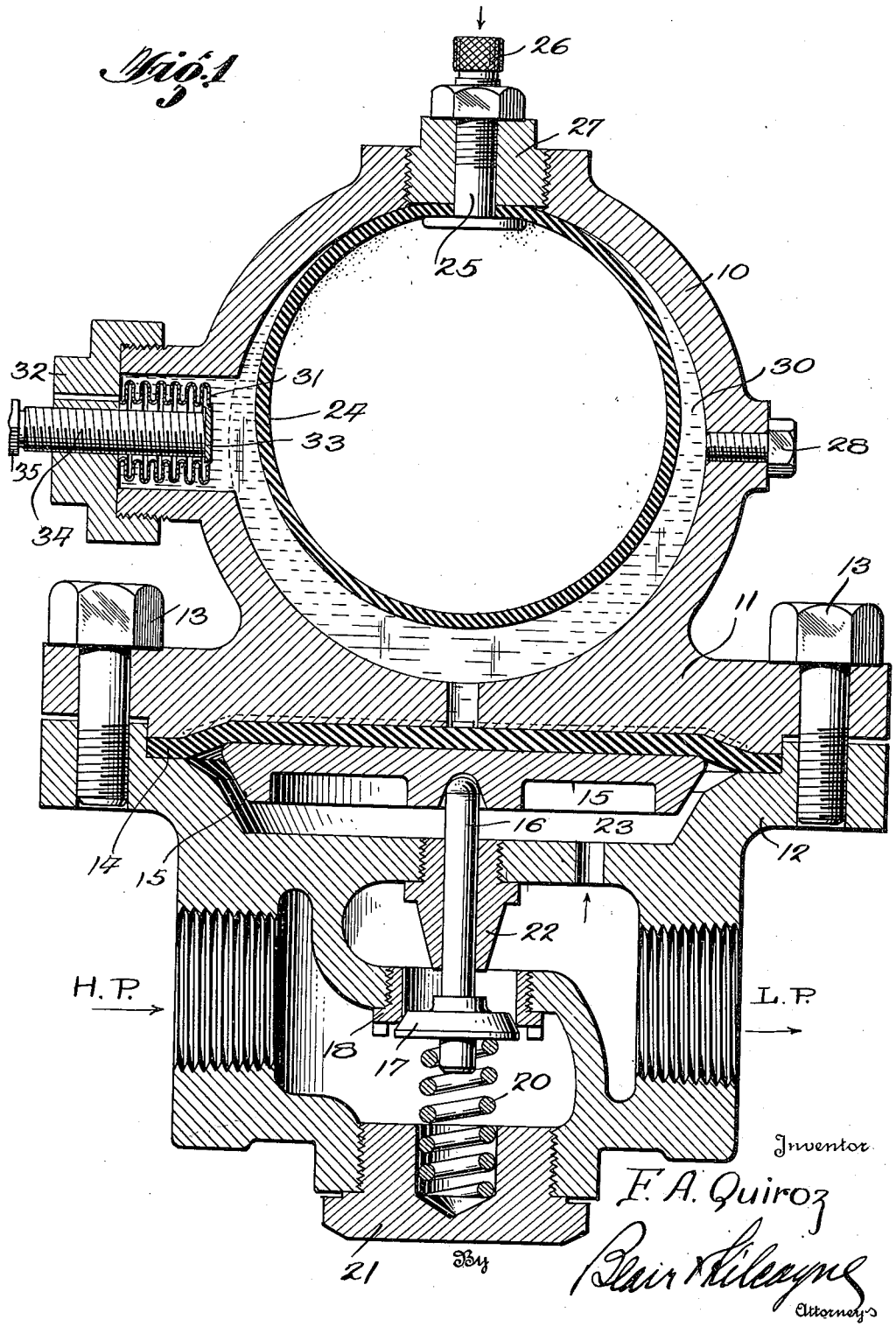

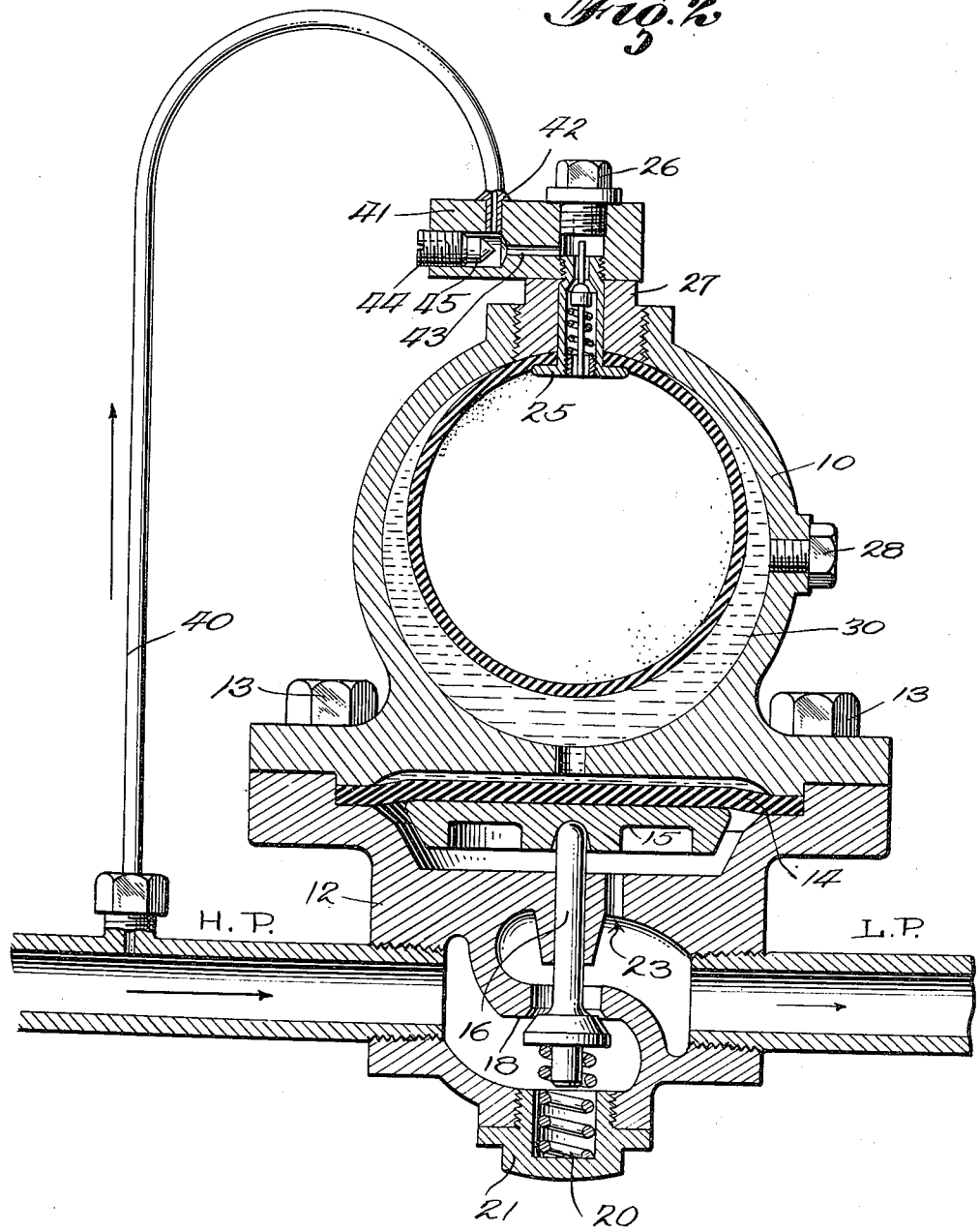

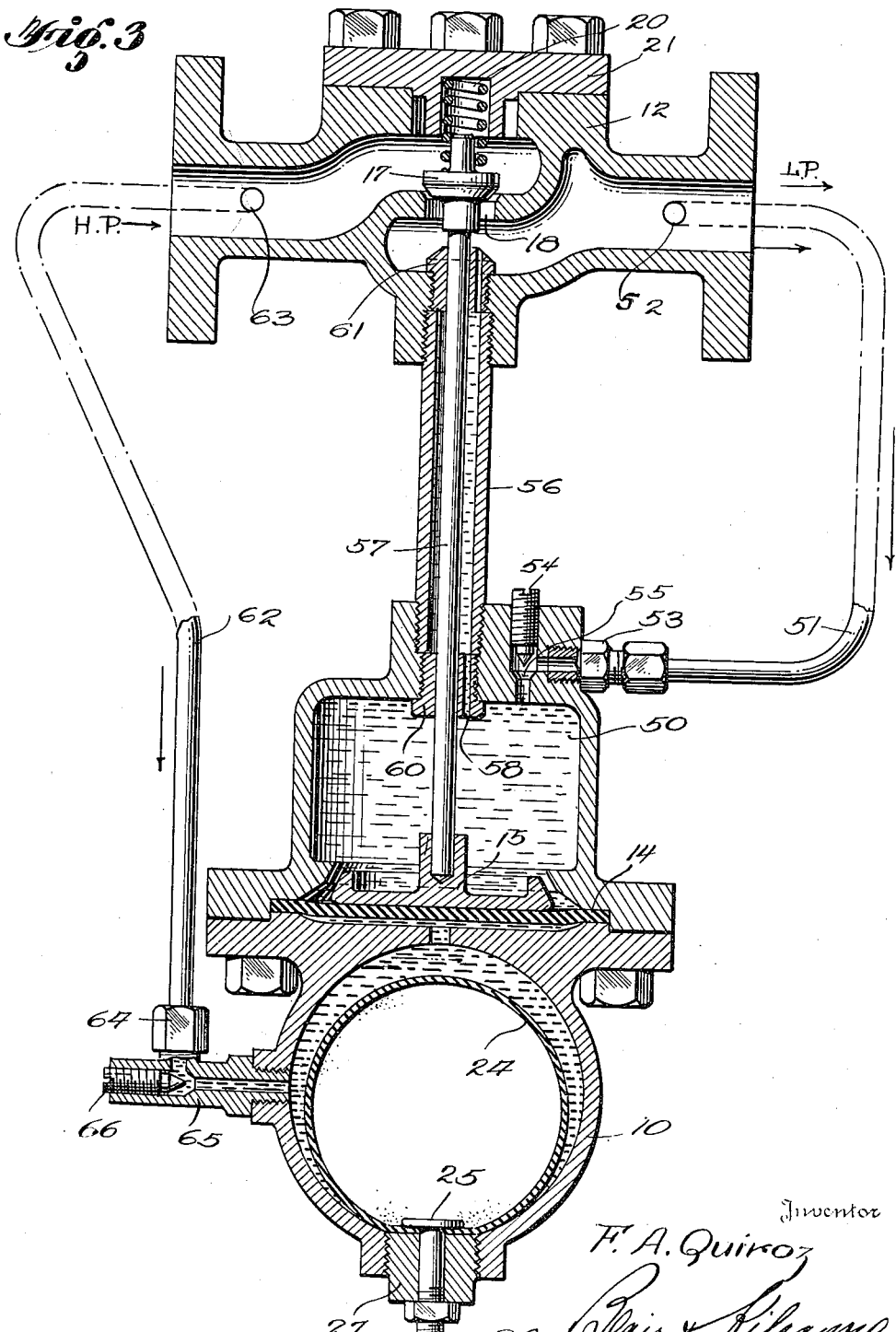

2,320,886

UNITED STATES PATENT OFFICE 2,320,886

REDUCING VALVE

Francisco Angel Quiroz, Newark, N. J., assignor to Kieley and Mueller, Inc., New York, N. Y., a corporation Application May 24, 1941, Serial No. 395,087

16 Claims. (Cl. 50—21)

This invention relates to valves and more particularly to that type which may be termed hydropneumatic pressure regulating or reducing valve.

One of the objects of the present invention is to provide a valve of the above general character, which will be simple in construction, relatively inexpensive to manufacture, and highly efficient in operation.

A further object is to provide a reliable valve of the above character, dispensing largely with the use of springs or weights so far as the regulating force is concerned.

A further object is to provide a valve of the above character particularly adapted for use on high pressure lines and utilizing the pressure of the fluid as the controlling agent.

A further object is to provide a regulator valve of the above character, in which standard castings may be used throughout, thereby avoiding the use of expensive forgings.

A further object is to provide a regulator valve which will be substantially free from vibration and chattering by the use of one or more fluids upon the diaphragm, one of the fluids being a non-compressible agent adapted to act as a damper to eliminate objectionable vibrations or pulsations.

A further object is to provide a valve of the above character in which the controlling pressure upon the diaphragm can be easily and quickly changed as desired.

A further object is to provide a valve of the above character, which will be less likely to get out of order or to require replacements by reason of certain heat insulating characteristics.

Other objects will be in part obvious from the annexed drawings and in part hereinafter pointed out in connection with the following analysis of this invention.

This invention accordingly consists in the features of construction, combination of parts, and in the unique relation of the various members and in the relative proportioning and disposition thereof, all as more completely outlined herein.

To enable others skilled in the art fully to comprehend the underlying features of this invention and the numerous modifications in structure and relation contemplated thereby, drawings depicting three of various possible modifications of the invention have been annexed as part of this disclosure, and in such drawings like characters of reference denote corresponding parts throughout all of the views, in which—

Figs. 1, 2 and 3 are, respectively, vertical, sectional views of three different modifications of valves but all using substantially the same principle of hydropneumatic control.

In all three of these modifications it will be noted that the usual high and low pressure lines are connected at opposite sides of one part of the valve, casing or member, the valve itself being controlled by the movement of a diaphragm, which movement of the diaphragm is in turn controlled in part by a chamber containing a fluid such as air or gas within a balloon-like body, substantially surrounded by a fluid directly acting upon the diaphragm.

Referring now to the drawings in detail, and particularly to Fig. 1, 10 indicates the dome of what may be termed the dome unit of the valve regulator which in the present case is an ordinary steel casting as distinguished from the impervious forging heretofore considered necessary to eliminate leakage. The lower part of the dome is provided with a circular flange 11 secured to the flange of the body 12 in any desired way as by means of screw bolts 13. Between these two flanges is positioned and clamped a diaphragm 14 of suitable, flexible material such as rubber or a rubber fabric composition.

Beneath the diaphragm 14 is a flat, compressed brass diaphragm button 15 having a central recess adapted to be engaged by one end of a stem 16 carrying a valve 17 at the other end coacting with a valve seat 18 and normally held in closed position by means of a carbon steel spring 20, one end of which is seated in a recess in a body cap 21.

This stem 16 passes through a suitable guide member 22 either screwed into the upper part of the base or body 12 as shown in Fig. 1 or integral therewith as in Fig. 2. A port or passage 23 leads from the low pressure side of the regulator valve to the chamber immediately adjacent the diaphragm 14.

The general construction, materials used and arrangement of these parts may be considered substantially of standard construction and operation, that is, fluid enters at the high pressure side, passes the valve 17 when open, and out to the low pressure side. When the pressure exceeds a predetermined or desired amount on the low side, then the diaphragm is forced upwardly to the position shown in Fig. 1 to close off further supply of high pressure fluid. When the pressure drops, then the valve automatically opens between the high and low pressure sides of the valve and remains open as long as the desired reduced pressure exists according to the differential.

The present invention is more particularly concerned with the dome unit or those parts above the diaphragm 14 in Fig. 1 for example. In the dome is positioned a rubber ball or balloon, indicated at 24, which is filled with a fluid such as air or gas through a valve stem 25 of any desired character. A screw cap 26 provides a protection to the valve mechanism itself within the stem 25 and also permits connection for a hose line with any suitable source of air or gas under pressure. The entire arrangement is analogous to an automobile tire and tire valve adapted to be connected with a tank of air. These parts may be assembled by forcing the rubber balloon 24, when deflated, through the opening in the top of the dome which opening is subsequently closed by means of a dome plug 27.

At some convenient point on the surface of the dome is a filler plug 28 of ordinary screw bolt construction which will permit the interior of the dome to be filled with glycerine or any suitable fluid as indicated at 30, and at another point on the surface of the dome is a bellows 31 reacting against a plug or closure cap 32. The free end of the bellows is provided with a plate 33 against which bears an adjusting screw 34 which may be easily turned by means of a nut indicated at 35. By moving the bellows in and out, the pressure upon the glycerine or fluid contained within the dome may be varied as desired and this in turn will react upon the balloon 24 and the upper surface of the diaphragm 14 counteracting the known expansion of the spring 20 and causing a change in the ratio between the high and low pressures.

It is thus seen that within the dome there is provided a pneumatic hydraulic cushion for the diaphragm 14 which will maintain a substantially constant pressure upon the diaphragm and act as a damper to prevent any pulsating or chattering action on the valve. By means of the adjusting screw 35 the pressure exerted upon the top side of the diaphragm may be easily and quickly changed as may be necessary. Thus, should the valve be subjected to a material drop in temperature as at night from normal higher temperature in the daytime, then there will be a reduction in volume of the gas or air within the balloon 24 and consequently an increased pressure must be exerted upon the fluid 30 surrounding such balloon to compensate for this loss in pressure and restore the differential desired.

In Fig. 2, the dome, base, diaphragm, valve, and high and low pressure lines are substantially the same as those above described in connection with Fig. 1. In this mechanism, however, to avoid pumping air into the balloon by hand; for example the balloon is supplied with air or gas under pressure from the high pressure supply line whenever the valve is used for handling air or a gas at low temperature that can be used for this purpose. Thus to raise the pressure in the balloon, air or gas is allowed to enter the balloon by merely opening the valve, and to lower the pressure the cap screw is removed and the valve therein depressed to allow a certain amount of air or gas to escape.

To do this there is provided a branch pipe 40 leading from the high pressure line directly to a casting 41 above the dome cap 27, which casting is provided with an inlet port 42 and a passage 43 normally closed by a screw plug 44 having a valve-like end 45 coacting with a suitable seat in this member 41. Thus, to obtain a variation of the gas pressure within the balloon 24, it is only necessary to back off the screw plug 44 with an ordinary screw driver or socket wrench whereupon high pressure air will immediately pass into the balloon through the valve stem member 25, thus increasing the pressure upon the fluid 30 within the dome 10. Such a construction is of particular importance where a source of compressed air does not happen to be available.

The modification shown in Fig. 3 is especially adapted for handling live steam or high pressure hot fluid, which fluid generally contains condensate. In this construction the relative position of the dome unit and the valve with its associated parts are reversed, that is, the dome 10 is placed at the bottom of the installation and the diaphragm 14 is interposed between the dome and a relatively large chamber 50 on the upper side of the diaphragm, which chamber is adapted to be filled with condensate from the low pressure line by means of a pipe 51 tapping into the high pressure line at any convenient point, such as indicated at 52.

The point of connection between the pipe 51 and the chamber 50 is by means of any suitable fluid-tight coupling 53, and the admission of condensate to the chamber 50 is controlled by means of a screw plug valve 54 engaging a valve seat 55 in the upper wall of the chamber 50, as shown. Thus the amount of condensate carried within the chamber and the pressure to which it is subjected is controlled in this manner.

Between the chamber 50 and the valve mechanism shown at the top of Fig. 3 is a relatively long tubular member 56 surrounding the diaphragm stem 57. A small port 58 passes through the guide plug 60, thereby allowing condensate to pass freely through this tube and also through a second perforated valve stem guide 61 at the top of the tube 56. Thus the diaphragm is not only remote from the valve member carrying the high pressure and the high temperature steam line, for example, but is also insulated therefrom by reason of the condensate within the tube 56 and chamber 50, thereby materially reducing the wear and tear upon the diaphragm 14 as well as the deleterious action of high temperatures on the rubber.

It will also be noted that, if desired, a high pressure line 62 may have one end tapped into the high pressure line at 63, and its opposite end connected by means of coupling 64 with a valve body 65 leading to the interior of the dome or that space surrounding the balloon 24. This connection is analogous to the bellows connection shown in Fig. 1, in that it allows the fluid surrounding the balloon to increase or decrease in volume, thereby to change the pressure of the air in the balloon 24. This pipe 62 is filled with condensate from the high pressure line backed by the high pressure of the line. Accordingly when the valve 66 is opened a small quantity of fluid is forced into the dome yet the dome is at all times insulated from the high temperature of the high pressure line.

As previously stated, this reverse construction and its connections is especially adapted for handling high pressure, high temperature steam lines and the parts are so positioned and arranged as to prevent live steam contacting with the diaphragm or balloon under any conditions. The condensate around the diaphragm and the fluid within the dome completely insulate the parts from direct contact.

The position and arrangement of the valves and diaphragm in Fig. 3 are those of normal operation, that is, the high pressure at one side of the valve, when at the desired differential with respect to the low pressure at the other side, will keep the valve 17 in a slightly open position as shown. As soon as the pressure lowers on the low pressure side beyond a predetermined amount, then the valve opens further, while an increase in pressure on the diaphragm acts through the ports in the guide plugs within the tube 56 to close the valve. The screw plug valves 54 and 66 are shown open in these views. It is, of course, to be understood that they are normally maintained closed and are manually opened for the purpose of varying the amount of condensate within the chamber 50 or pressure upon the fluid within the balloon within the dome as and when necessary, primarily according to the variations in temperature of the surrounding atmosphere or possible losses due to leakage.

It is unnecessary to go into the operation of these pressure regulating valves as their function and purpose broadly speaking are well known to those skilled in the art. The invention resides more particularly in the novel position and arrangement of the dome and its associated parts forming the dome unit whereby a more uniform pressure reduction may be maintained between the high and low pressure lines and the elimination of any pulsating or chattering of the valve by reason of the hydropneumatic damper within the dome and acting upon the diaphragm.

The invention is particularly important in that the heretofore necessary expensive forgings are completely eliminated and ordinary steel castings will answer the purpose just as well inasmuch as the pressures within the dome may be easily and quickly adjusted as may be necessary. Thus the invention is well adapted to accomplish among others all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention and therefore such adaptations should and are intended to be comprehended within the meaning and range of equivalency of the following claims.

I claim:

1. A dome unit particularly adapted for use with a valve, comprising a dome having an opening, a diaphragm adjacent said opening, a flexible air container within said dome and means for controlling the amount of fluid within said container.

2. A device as set forth in claim 1 in which said dome has a normally closed filling opening to permit a second fluid to be admitted thereto and about said container.

3. A dome unit particularly adapted for use with a valve, comprising a fluid carrying dome having an opening, a diaphragm adjacent said opening and subject to fluid pressure, a flexible air container within said dome and occupying the larger part of the interior of said dome when filled with air, and valve means for controlling the amount of air within said container, said dome having a filling opening to permit a second fluid to be admitted between the interior of the dome and the exterior of the container whereby the air container and surrounding fluid provides a dampener for the valve.

4. A dome unit particularly adapted for use with a pressure reducing valve comprising, a dome having an opening, a diaphragm adjacent said opening, a balloon within said dome and occupying the larger part of the interior of said dome when inflated and means for controlling the amount of air within said balloon, said dome having its remaining volume filled with a second fluid about the exterior of the balloon.

5. A device as set forth in claim 4 in which a gas fills the balloon to any desired pressure and a liquid substantially surrounds the space between the balloon and dome.

6. A dome unit particularly adapted for use with a pressure reducing valve, comprising a dome having an opening, a diaphragm adjacent said opening, a balloon within said dome filled with gas, means for controlling the amount of gas within said balloon, and a closure plug carrying said valve means to permit easy assembly when the balloon is collapsed, said dome having a normally closed filling opening to permit a fluid to be admitted between the interior of the dome and the exterior of the balloon.

7. A dome unit particularly adapted for use with a pressure reducing valve, comprising a dome having an opening, a diaphragm adjacent said opening, a balloon within said dome and occupying the larger part of the interior of said dome when filled with a gas, valve means for controlling the amount of gas within said balloon, and a plug carrying said valve means to permit easy assembly when the balloon is collapsed, said dome having a normally closed filling opening to permit a fluid to be admitted between the interior of the dome and the exterior of the balloon after the balloon has been inflated.

8. A hydropneumatic reducing valve comprising, in combination, a valve carrying member having high and low pressure lines connected therewith for the passage of hot fluid and condensate, a dome member, a flexible gas container therein, a diaphragm below the valve carrying member and above the dome member, and connections between the high and low pressure lines and the opposite sides of said diaphragm respectively, whereby the condensate from the high or low pressure lines may pass downwardly to insulate the diaphragm from direct contact with hot fluid passing through the lines.

9. A valve of the character set forth in claim 8, in which the valve carrying member and the dome member are separated by an elongated tube.

10. A hydropneumatic reducing valve comprising, in combination, an upper valve carrying member having high and low pressure lines connected therewith for the passage of hot fluid and condensate, a lower dome member, a diaphragm between the valve carrying member and the dome member, and connections between the high and low pressure lines and opposite sides of said diaphragm respectively whereby the condensate from either the high or low pressure lines may flow downwardly to insulate the diaphragm from direct contact with hot fluids passing through the line, said dome member having a balloon member positioned therein, and an inlet valve to permit inflation of the balloon to the desired degree.

11. A hydropneumatic reducing valve comprising a valve member having high and low pressure gas lines connected therewith, a dome member, a diaphragm between said valve member and dome member, a closed flexible fluid dampening means positioned in said dome member and adapted to be surrounded by a liquid in the dome to act on said diaphragm, and a connection between the high pressure gas line and the interior of said dampening means.

12. A hydropneumatic reducing valve comprising a valve member having high and low pressure gas lines connected therewith, a dome member and a diaphragm secured between said valve member and dome member, said dome member having a separate flexible air containing balloon positioned therein and adapted to be surrounded by a liquid acting on said diaphragm, and a connection between the high pressure gas line and the interior of said balloon whereby the balloon may be inflated from said high pressure line.

13. A hydropneumatic reducing valve comprising a valve carrying member with high and low pressure lines connected therewith, a valve separating said lines, a dome member having an opening at one portion, a diaphragm between the valve carrying member and the dome member adjacent said opening, a dampening means including a flexible container filled with gas under pressure positioned within the dome, and a fluid within the dome and substantially surrounding the container whereby both fluid and gas filled container act upon said diaphragm to cushion the movement of the valve.

14. A valve of the character set forth in claim 13, means for conducting fluid from one of said lines directly to the interior of said dome, and means for controlling the passage of said fluid.

15. A hydropneumatic reducing valve comprising a valve carrying member with high and low pressure lines connected therewith, a valve with a valve stem separating said lines, a dome member having an opening at one portion, a diaphragm between the valve carrying member and the dome member adjacent said opening, a tube materially separating said valve carrying member from said dome and through which said valve stem passes, a flexible container adapted to be filled with gas under pressure positioned within the said dome, a liquid substantially surrounding said container and acting upon said diaphragm, and means for conducting fluid from one of said lines directly to the interior of said dome.

16. A hydropneumatic reducing valve comprising, in combination, a valve carrying member having high and low pressure lines connected therewith for the passage of hot fluid and condensate, a dome member below the valve member, a diaphragm between the valve member and the dome member, and connections between the high and low pressure lines and the opposite sides of said diaphragm respectively to permit the condensate from either the high or low pressure lines to flow downwardly to insulate the diaphragm from direct contact with hot fluid passing through the line, said valve carrying member and dome member being materially separated from each other with the dome member below the pressure lines.

FRANCISCO ANGEL QUIROZ.